United States Patent [19]
Young

[11] 3,803,979
[45] Apr. 16, 1974

[54] ENGRAVING APPARATUS
[76] Inventor: James A. Young, 4200 Opal Cliffs Dr., Santa Cruz, Calif. 95060
[22] Filed: Aug. 31, 1972
[21] Appl. No.: 285,453

[52] U.S. Cl. .................................. 90/13.3, 82/14 R
[51] Int. Cl. ............................................. B23c 1/18
[58] Field of Search ......... 90/13.3, 13.6, 13.4, 13.7, 90/13.1; 82/14 R

[56] References Cited
UNITED STATES PATENTS

| | | |
|---|---|---|
| 1,874,046 | 8/1932 | Jonsson............................. 90/13.3 X |
| 3,587,388 | 6/1971 | Muehlenweb..................... 90/13.3 X |
| 2,018,763 | 10/1935 | Kirby.................................. 90/13.3 |
| 375,705 | 12/1887 | Gudel et al. ......................... 82/14 R |

Primary Examiner—Leonidas Vlachos
Attorney, Agent, or Firm—Paul B. Fihe

[57] ABSTRACT

An engraving apparatus which includes means for supporting a workpiece for motion in mutually-perpendicular directions along its surface to be engraved, and an engraving head arranged for motion perpendicular to such surface enabling engraving contact therewith.

1 Claim, 4 Drawing Figures

ENGRAVING APPARATUS

FIELD OF THE INVENTION

The present invention relates generally to the art of engraving and more particularly to an engraving apparatus capable of precise engraving in a desired pattern on a complex surface.

BACKGROUND OF THE INVENTION

Engraving apparatus currently in use is capable of precision engraving in a flat, exposed surface through control of the engraving head position by a pantograph-type arrangement which senses the desired master pattern in a template. If, however, one departs from a workpiece having the flat, exposed surface, considerable complexities are introduced, and to date no practical solution has been devised. It will be apparent that if the surface of the workpiece is curved rather than flat, the planar translational motion of the master template pattern sensing unit cannot be directly translated to the workpiece or engraving head to follow the curved contour. Some complexity is added if the curvature is in but one direction such as found in a cylindrical surface and yet additional complexity will be introduced if the surface be conical or some other form of a figure of revolution whose radial dimensions vary. Regardless of the surface conformation of the workpiece, if such surface constitutes an interior surface rather than an exterior one which is directly exposed, yet further problems unsolved until the time of the present invention are introduced.

SUMMARY OF THE PRESENT INVENTION

It is the general object of the present invention to provide an engraving apparatus which enables the engraving process to be carried out in both interior and exterior surfaces whether those surfaces be flat or of relatively complex geometric conformation.

In general terms, this objective is achieved by supporting the workpiece which is to be engraved for motion in two mutually-perpendicular directions along its surface which shall be denominated the X and Y directions, and by associating therewith the engraving head or cutter for motion in a Z direction which is perpendicular to the surface that is to be engraved. The simple Z direction motion of the engraving head enables mounting at the end of a thin, elongated supporting arm which enables its projection into the interior of a relatively small hollow article thus allowing the interior surface to be engraved.

By way of example, if the workpiece be in the form of a hollow structure whose interior surface is generally frusto-conical in its conformation, such workpiece is supported for rotation about its axis by a chuck which provides for the Y direction motion thereof. In turn, the chuck is supported from a carriage that is mounted for slidable longitudinal motion providing for an X direction motion of the chuck and the workpiece supported thereby. So that such X direction motion will correspond to the interior surface of the frusto-conical workpiece, the chuck is mounted on the carriage for angular adjustment so that a longitudinal line on such frusto-conical surface is parallel to the longitudinal slidable direction of carriage motion.

As previously mentioned, the engraving head or cutter is mounted at the end of the thin arm for slight motion in the Z direction, or in other words, in a direction perpendicular to the defined X and Y directions so that engraving contact with the surface of the workpiece can be achieved. To accommodate workpieces of variant dimensions and conformations, the entire arm which supports the engraving head can be adjusted both in a Z and X direction prior to the engraving operation.

So that a flat portion on a master template can be duplicated on the interior frusto-conical surface, a novel pantograph is utilized so that the X direction adjustment of the pattern sensor is arranged to effect longitudinal X direction motion of the carriage and in turn the Y direction adjustment of the pantograph sensor is arranged to effect rotative Y adjustment of the chuck and accordingly of the workpiece mounted thereon.

Simple adjustment of the pantograph linkages enable engraving of exterior surfaces of frusto-conical or other configuration and consequently the apparatus is easily adapted for the engraving of a wide variety of surfaces through utilization of the general concept providing X and Y adjustments of the workpiece and a simple Z directed motion of the engraving head or cutter.

BRIEF DESCRIPTION OF THE DRAWINGS

The stated objective of the invention and the manner in which it is achieved as summarized hereinabove will be more readily understood by reference to the following detailed description of an exemplary embodiment of the invention shown in the accompanying drawings wherein.

DETAILED DESCRIPTION OF THE EXEMPLARY EMBODIMENT OF THE INVENTION

Figure 1:
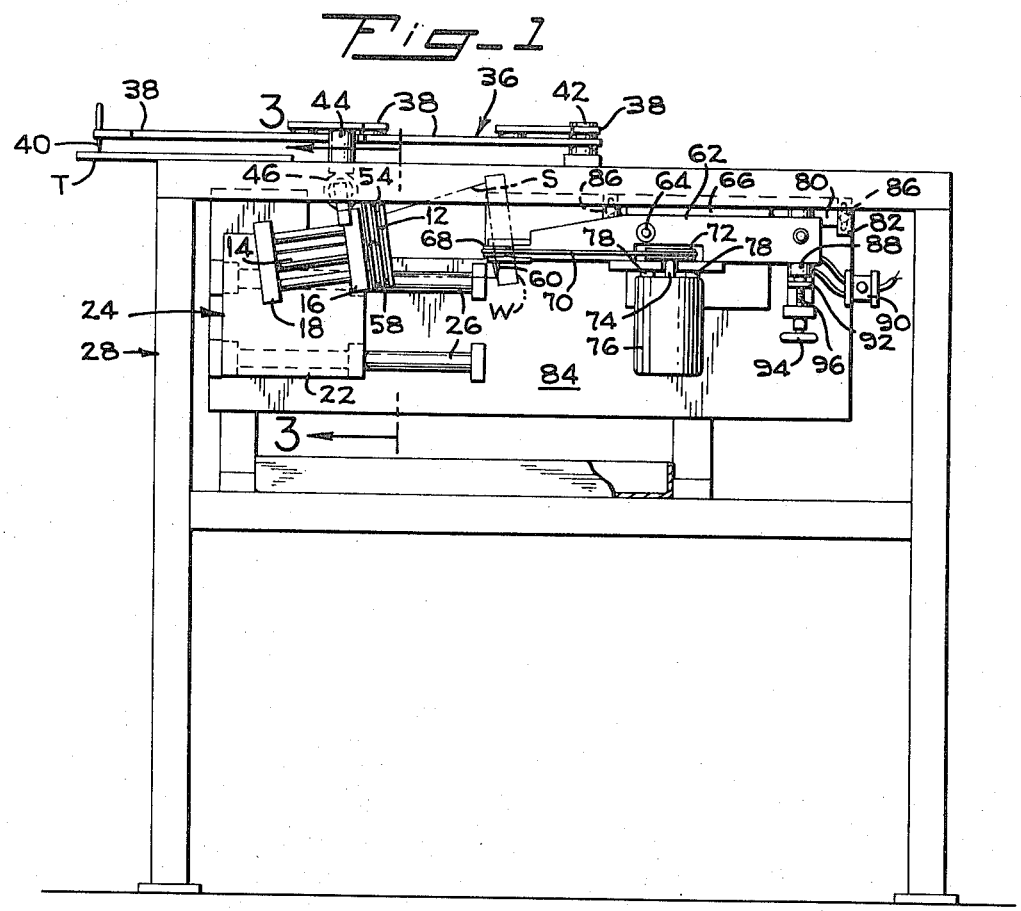
FIG. 1 is a side elevational view of an engraving apparatus embodying the invention.
Figure 2:
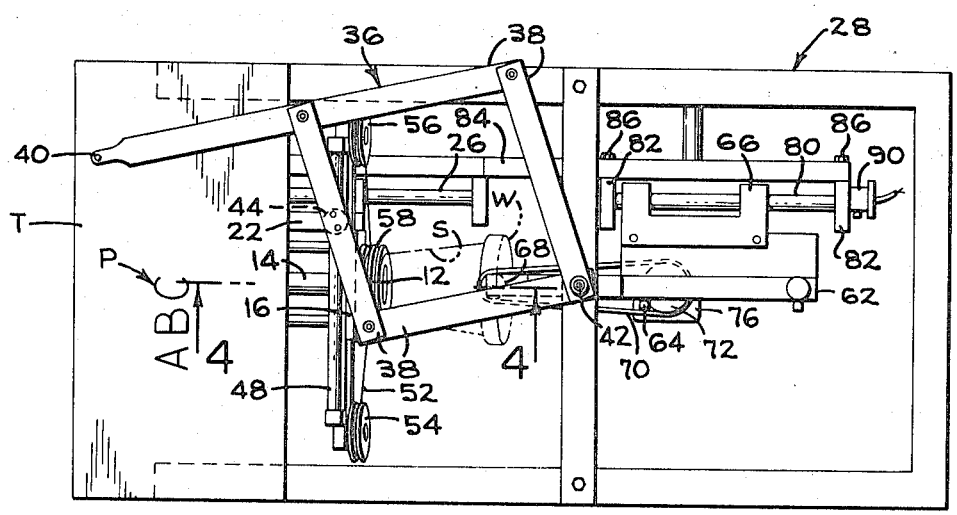
FIG. 2 is a top plan view thereof.
Figure 4:
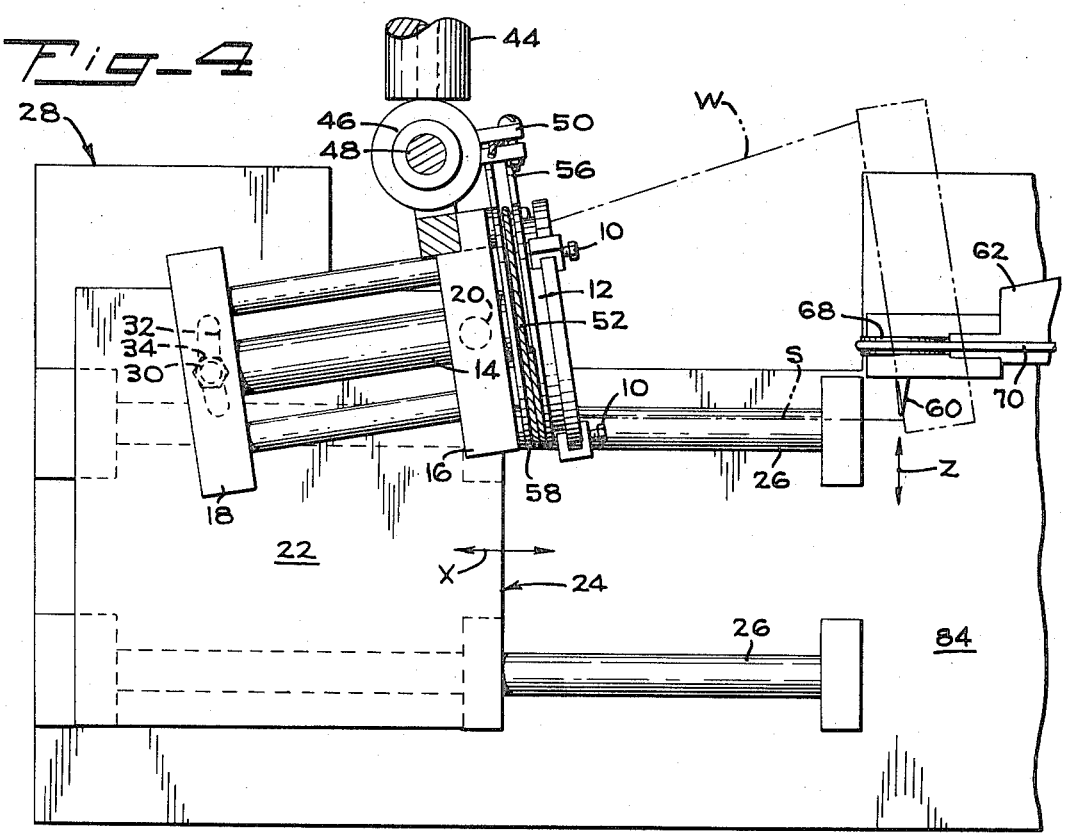
FIG. 4 is an enlarged fragmentary sectional view taken along line 4—4 of FIG. 2.

As illustrated in phantom lines in FIGS. 1, 2, and 4, the workpiece W which is to be engraved is in the form of a hollow metal mold whose interior surface S has a frusto-conical conformation, such being the type of mold which forms the outer surface of an expanded plastic bead cup. Interior engraving of the frusto-conical surface of such mold in turn provides for raised lettering on the cup exterior after the molding process is complete.

A small flange at the base of the mold W enables rigid mounting thereof by small clamp screws 10 to a chuck 12 that is supported at one extremity of a shaft 14 that is in turn supported for rotation in suitable spaced bearings (not shown) within spaced mounting brackets 16, 18. One of the mounting brackets 16 is pivotally supported on a rod 20 that projects laterally from a plate 22 which forms part of a carriage 24 mounted for sliding motion on spaced horizontal rods 26 carried from one side of the open rectangular frame 28 of the apparatus. Such carriage motion defines the X direction of motion of the carriage 24 as indicated by the X arrows in FIG. 4, and all elements including the workpiece W supported therefrom. A second rod 30 projects laterally from the second shaft-mounting bracket 18 in parallelism to the described pivot rod 20 and extends through an arcuate slot 32 in the carriage plate 22 so that suitable loosening and tightening of a nut 34 on the threaded end of such rod enables angular adjustment of the chuck-supporting shaft 14 relative to the carriage 24. Accordingly, depending upon the angle between the interior surface of the frusto-conical workpiece W and its central axis of rotation, the described angular adjustment may be made to bring the lowermost surface S of the workpiece into parallelism with the direction of carriage motion along its supporting rods 26 which, as previously mentioned, constitutes the X direction of motion.

Figure 3:
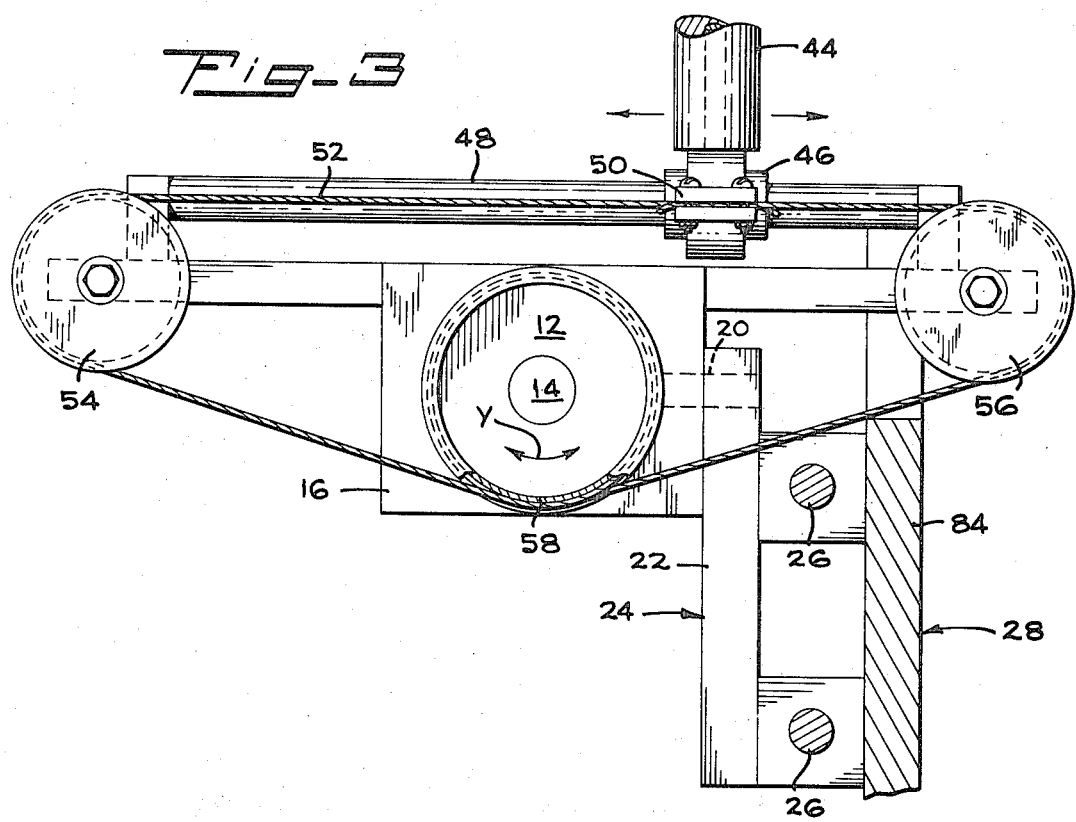
FIG. 3 is an enlarged fragmentary transverse sectional view taken along line 3—3 of FIG. 1.

The Y direction of motion is that motion of the interior surface S to be engraved transversely to the described X direction, and since such interior surface is frusto-conical, as previously described, in the present instance, the Y motion is rotative, as indicated by the arrows Y in FIG. 3. Quite obviously, the chuck mounting of workpiece W enables the Y motion to be achieved.

Appropriate connections to a pantograph 36 are arranged to impart both the X and Y motions to the workpiece W so that its disposition will change in accordance with the configuration of a master pattern P on a flat template T carried on the machine frame 28, as best shown in FIG. 2.

More particularly, the basic components of the pantograph 36 are of a standard nature including four rigid links 38 joined in a variable parallelogram configuration, the projecting extremity of one rod carrying a downwardly dependent sensor 40 that is adapted to engage and follow the pattern P in the template T. The opposite extremity of the parallelogram linkage is pivotally joined by a pin 42 fixed to a cross member of the machine frame 28. At an intermediate position in one of the parallelogram links, a dependent connecting member 44 supports a sleeve 46 that slidably encompasses a cross bar 48 that is connected to and extends across the top of the carriage 24. Accordingly, if the pantograph sensor is moved in the X direction either to the left or right as viewed in FIG. 2, the connecting sleeve 46 and the cross bar 48 are moved similarly to the left or right with appropriate ratio of dimensional motion depending upon the size of the pantograph links 38, thus ultimately moving the carriage 24 and the workpiece W supported therefrom in the X direction.

The described sleeve 46 also mounts a laterally projecting clamp 50 for a piano wire 52 or other non-stretchable line which, as best shown in FIG. 3, passes around pulleys 54, 56 mounted at opposite sides of the carriage and thence inwardly for connection to the bottom of a pulley 58 keyed to the shaft 14 immediately adjacent the workpiece mounting chuck. Accordingly, if the sensor 40 of the pantograph 36 is moved upwardly or downwardly, as viewed in FIG. 2 which constitutes the Y direction, the sleeve 46 will move along the cross bar 48 in turn effecting motion of the piano wire 52 and appropriate rotation of the chuck 12 and the workpiece W mounted therefrom to provide the requisite Y adjustment of the workpiece. It is notable that a simple change in the connection of the piano wire 52 to the top of the pulley on the chuck shaft 14 will reverse the Y direction of workpiece motion to enable the template pattern to be followed on the exterior of a workpiece W rather than its interior surface, as herein shown.

The engraving head or cutter 60 is mounted for limited displacement in a Z direction, as indicated in FIG. 4, substantially perpendicular to the X and Y directions, as defined herein, thus to engage the interior surface of the workpiece W. Preferably, as illustrated best in FIGS. 1 and 2, the engraving cutter 60 is rotatably supported to project downwardly from the end of an elongated arm 62 which is pivotally mounted at a remote position on a transverse rod 64 that is carried by an arm-supporting bracket 66 thus to define an axis of pivotal motion which is perpendicular to the Z direction. The engraving head or cutter 60 is a rotatable unit supported from a simple stub shaft (not shown) that projects substantially in the Z direction and mounts a small pulley 68 for the reception of a flexible endless drive belt 70 that also is trained about another pulley 72 mounted on a drive shaft 74 extending upwardly from a small electric motor 76 that is also carred by suitable brackets 78 from the central portion of the described pivoted arm 62, suitable connections (not shown) being made for motor actuation from a standard 110 volt source. The bracket 66 that pivotally supports the engraving head arm 62 is mounted on suitable rods 80 supported from brackets 82 to extend in substantially X direction or longitudinally in parallelism with the supporting carriage for the workpiece W, and a slotted connection of the bracket 82 to a support plate 84 which is, in turn, connected by bolts 86 to slots of the frame for adjustment in the Z direction, provides for variation of the set dispositon of the engraving head 60 to enable accommodation of workpieces of various dimensions.

The arm 62 is normally supported, as shown best in FIG. 4, so that the engraving head or cutter 60 lies in a Z disposition slightly spaced from the surface S to be engraved and suitable actuation by means supported at the remote end of the arm brings that end upwardly so that the engraving head 60 is in turn brought downwardly into engraving contact with the surface of the workpiece W. While such actuating means can take many forms, it is preferred as shown to utilize a pneumatic ram 88 that is connected to a suitable source of air pressure by manually-controlled valve 90 enabling the operator to establish engraving contact of the head with the workpiece. To control the depth of cut, an adjustable stop, as indicated at 92 in FIG. 1, is arranged to limit the upward motion of this end of the engraving head arm 62 thus to limit the downward motion of the engraving head 60 at its opposite extremity. A manually operated handle 94 is connected by suitable threaded rod 96 to the stop 92 to adjust the defined limit and accordingly the depth of the engraving cut.

It is apparent that the apparatus as described providing for X and Y variations in the disposition of the workpiece and the Z direction motion of the engraving head provides not only for the engraving of the interior or exterior surface of a workpiece, but also accommodates large dimensional variations in such workpiece including variation in its conformation, and accordingly, the foregoing description of but one embodiment of the invention is to be considered as purely exemplary and not in a limiting sense and the actual scope of the invention is to be indicated only by reference to the appended claims.

I claim:

1. Engraving apparatus which comprises means supporting a workpiece for motion in mutually-perpendicular X and Y directions along its surface, an engraving head supported for motion in a Z direction substantially perpendicular to the surface of the workpiece, means including a pantograph responsive to variations in the X and Y coordinates of a pattern for shifting the X and Y disposition of the workpiece, said supporting means for the workpiece including a chuck mounted for rotation and adapted to releasably mount the workpiece, said supporting means including a carriage mounting said chuck for rotational motion and itself mounted for slidable motion in an X direction in response to actuation of said pantograph means, and means mounting said chuck on said carriage for angular adjustment of its axis of rotation.

* * * * *